Figure 1:
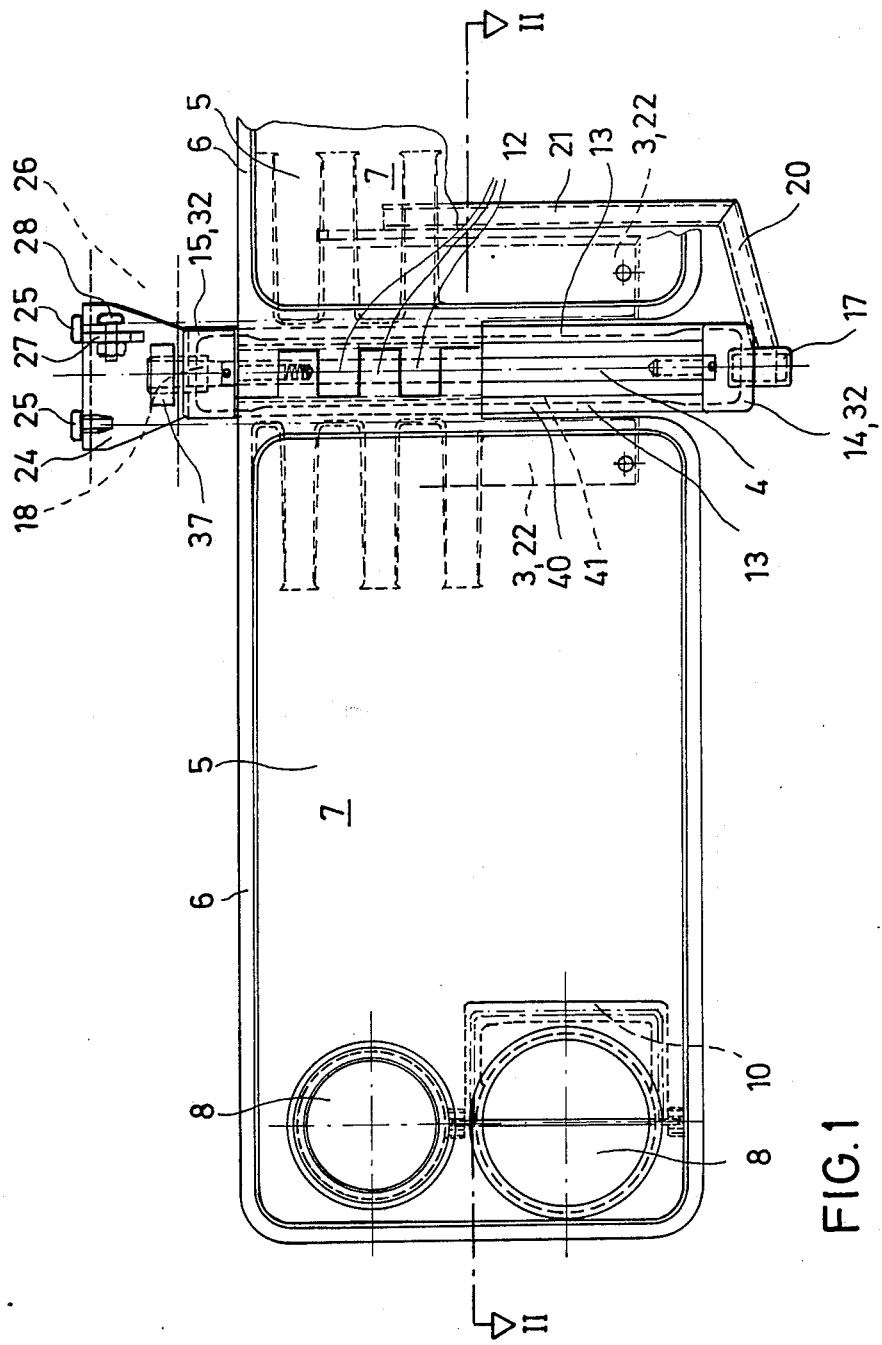

United States Patent [19]

Kauer

[11] Patent Number: 4,958,576
[45] Date of Patent: Sep. 25, 1990

[54] FOLD-AWAY TABLE

[75] Inventor: Kurt Kauer, Ulm/Donau, Fed. Rep. of Germany

[73] Assignee: Karl Kassbohrer Fahrzeugwerke GmbH, Ulm, Fed. Rep. of Germany

[21] Appl. No.: 377,609

[22] Filed: Jul. 10, 1989

[30] Foreign Application Priority Data

Jul. 13, 1988 [DE] Fed. Rep. of Germany ....... 8809005

[51] Int. Cl.$^5$ .............................................. A47B 41/04
[52] U.S. Cl. .................................... 108/35; 257/145; 108/33
[58] Field of Search ................. 108/33, 35; 297/145, 297/144, 155, 154

[56] References Cited

U.S. PATENT DOCUMENTS

| 1,869,444 | 8/1932 | Tobey | 108/33 X |
| 2,845,113 | 7/1958 | Keel | 297/145 |
| 3,583,760 | 6/1971 | McGregor | 297/145 |
| 3,632,161 | 1/1972 | Arfaras et al. | 297/145 |
| 3,683,825 | 8/1972 | Sheldon | 108/33 |
| 4,756,572 | 7/1988 | Dykstra | 297/145 X |
| 4,834,449 | 5/1989 | Engleman | 297/145 |

FOREIGN PATENT DOCUMENTS

3329865 3/1985 Fed. Rep. of Germany ...... 297/145

*Primary Examiner*—Peter A. Aschenbrenner
*Attorney, Agent, or Firm*—Samuels, Gauthier & Stevens

[57] ABSTRACT

A fold-away table is provided for a seat in a vehicle, particularly a motorcoach. The table comprises a mounting structure disposed laterally of the seat, and a carrier structure mounted for displacement in a vertical plane between a lowered storage position and a raised use position. The carrier structure includes a pivot axis having at least one table element mounted thereon. A fold-away table of this type should be readily operable and protected from soiling. To this purpose the mounting structure is formed as a stationary vertical guide structure. The carrier is formed as a guided housing structure containing the table element and permitting it to be displaced between the use position and the storage position. The pivot axis extends substantially horizontally within the housing structure.

25 Claims, 4 Drawing Sheets

FOLD-AWAY TABLE

The present invention relates to a fold-away table for vehicle seats, particularly for motorcoach seats, comprising a mounting base secured to the seat frame laterally of the seat, a carrier mounted on the mounting base for displacement in a substantially vertical plane between a lowered storage position and a raised use position, and a pivot axis movably mounted on the carrier and having at least one table element mounted thereon for pivoting between a folded and an unfolded position.

Known from DE-OS 33 29 865 is a fold away table of this type disposed between the seats of a motorcoach double-seat, the mounting base of which is formed as a flanged support member disposed adjacent the front edge portion of the seat cushions of the seats. The carrier is formed as a carrier rod having its lower end hinged to the upper end of the vertical flanged support member by a first hinge permitting pivotal movement about an arc of about 90° and located at a level corresponding to about half the height of the seat cushion surfaces. A second hinge connects the upper end of the carrier rod to a central portion of the pivot axis carrying a pair of table elements, the second hinge permitting pivotal movement about an arc of about 180°.

In the lowered storage position, the carrier rod extends rearwards of the vertical flanged support member in a substantially horizontal direction towards the backrests of the seats. The pivot axis depends substantially vertically downwards with respect to the carrier rod, the folded or collapsed table elements being disposed in the plane defined by the flanged support member, the carrier rod and the pivot axis. This results in the disadvantage that the table elements are disposed between the seats without any protection, so that they get easily soiled. In addition, the folded or collapsed fold-away table occupies nearly all of the space between the seat in height and length. Furthermore the end portions of the table elements adjacent the pivot axis are of reduced width, resulting in a reduction of the useful table surface area, for preventing the table elements from colliding with a cross member of the seat frame in their lowered storage position. The construction, moreover, of the known fold-away table is relatively expensive due to the use of two hinged connections rendering the handling of the table rather difficult.

For unfolding the table from its lowered storage position to its raised use position, the carrier rod has to be pivoted upwards and forwards about the first hinge to a vertical position, in which the pivot axis with the folded table elements suspended therefrom extends horizontally rearwards from the carrier rod. In this position the user has to take care that the carrier rod does not drop back to the storage position due to the weight of the pivot axis and the table elements The pivot axis with the table elements suspended therefrom is then pivoted forwards about the second hinge so as to extend horizontally forwards of the carrier rod. The radius of this pivoting displacement corresponds to the length of the table elements and is thus rather long. During this operation the user has to clamp the table elements together for preventing them from abruptly unfolding and being thereby damaged. Only after the pivot axis has reached its final position forwards of the carrier rod, the user may release the table elements for unfolding them to their use position. The return of the fold-away table to the lowered storage position requires the same fastidious operations in the reverse sequence.

It is an object of the invention to improve a fold-away table of the type defined in the introduction so as to simplify its construction and facilitate its handling while reducing the danger of soiling the table.

This object is attained according to the invention by the provision that the mounting base is formed as a stationary vertical guide structure, and the carrier, as a housing structure surrounding the table element at least laterally and mounted in the guide structure for sliding displacement between its use position and its storage position, said pivot axis extending sibstantially horizontally and being slidingly displaceable in the housing structure between a lowered storage position and a raised use position.

In the lowered storage position, the pivot axis together with the table elements is received in the housing structure and thus substantially protected from becoming soiled. The described construction makes use of two simple sliding guides rather than of two structurally more complicated hinges. The handling of the fold-away table according to the invention ia very simple. For unfolding the table the user simply grips the edges of the table elements, which preferably project slightly above the upper edge of the housing structure enclosing them, and pulls the table elements upwards until the housing structure and the pivot axis have been raised to the use position. The table elements may then readily be folded outwards to their respective use position. The return of the fold-away table according to the invention is accomplished in a similarly simple manner in reversed sequence of the described operations.

The housing structure preferably comprises two guide plate members and two guide rails. In this case the stationary guide structure may comprise two guide elements each engaging a respective outer guide groove in the guide rails. The guide rails are preferably provided with respective inner guide grooves for guiding respective slide blocks secured to the ends of the pivot axis. In an advantageous embodiment of the invention, the upper ends of the guide rails are each provided with a head portion defining an inner and an outer stop face for the pivot axis and the housing structure, respectively, at respective ends of the inner and outer guide grooves. In this case the upper end faces of the guide elements may be formed as counterstop surfaces for cooperation with the outer stop faces. In an advantageous embodiment, the lower ends of the guide plate members may be provided with a stop for the pivot axis.

The table element may be guided free of play on the guide plate members by the provision of a resilient bracket preferably secured to the table element. According to an improved embodiment of the invention the table element may be formed with at least one through-opening for receiving a container therein. In this case the above-mentioned bracket may be mounted for pivoting between a folded position adJacent the table element and an unfolded position below the through-opening for supporting a container therein.

The table element is preferably mounted on the pivot axis by means of a bearing sleeve which may be provided with a slot extending over its full length and having a width slightly smaller than the diameter of the pivot axis. The bearing sleeve may also be of resilient construction so as to be protected from damage.

In a preferred embodiment of the invention the pivot axis carries two table elements mounted thereon. In this case, the bearing sleeves of the two table elements may be vormed as a plurality of finger elements mounted in alternating sequence on the pivot axis. The width of the finger elements of the two table elements as measured in the longitudinal direction of the pivot axis may then substantially correspond to half of the length of the latter. The table element or elements, respectively, are preferably slidable along the pivot axis between a position close to the user in proximity of the back rest of the seat, and a position removed from the user.

According to a preferred embodiment of the invention, the upper rims of the guide plate members may be formed as respective supports for the unfolded table elements, the frictional engagement between these rim portions and the table elements preventing the latter from being inadvertently shifted towards or away from the user.

The insertion of the table elements into the housing may be facilitated by the provision of flared inlet guide surfaces between the upper rim portions of the guide plate members and their main body.

The stationary guide structure may suitably be disposed at the level of the seat surface of the seat.

In the raised use position, the housing structure may advantageously be locked by a detent lever engaging a detent opening in one of the guide rails. This detent lever may suitably be mounted on the rear guide element facing towards the backrest of the seat.

The rear guide element may suitably be secured to a cross member of the seat frame by means of a mounting bracket. The front guide element facing away from the backrest of the seat may then be secured to a flange of the seat frame by means of a carrier structure.

Figure 2:
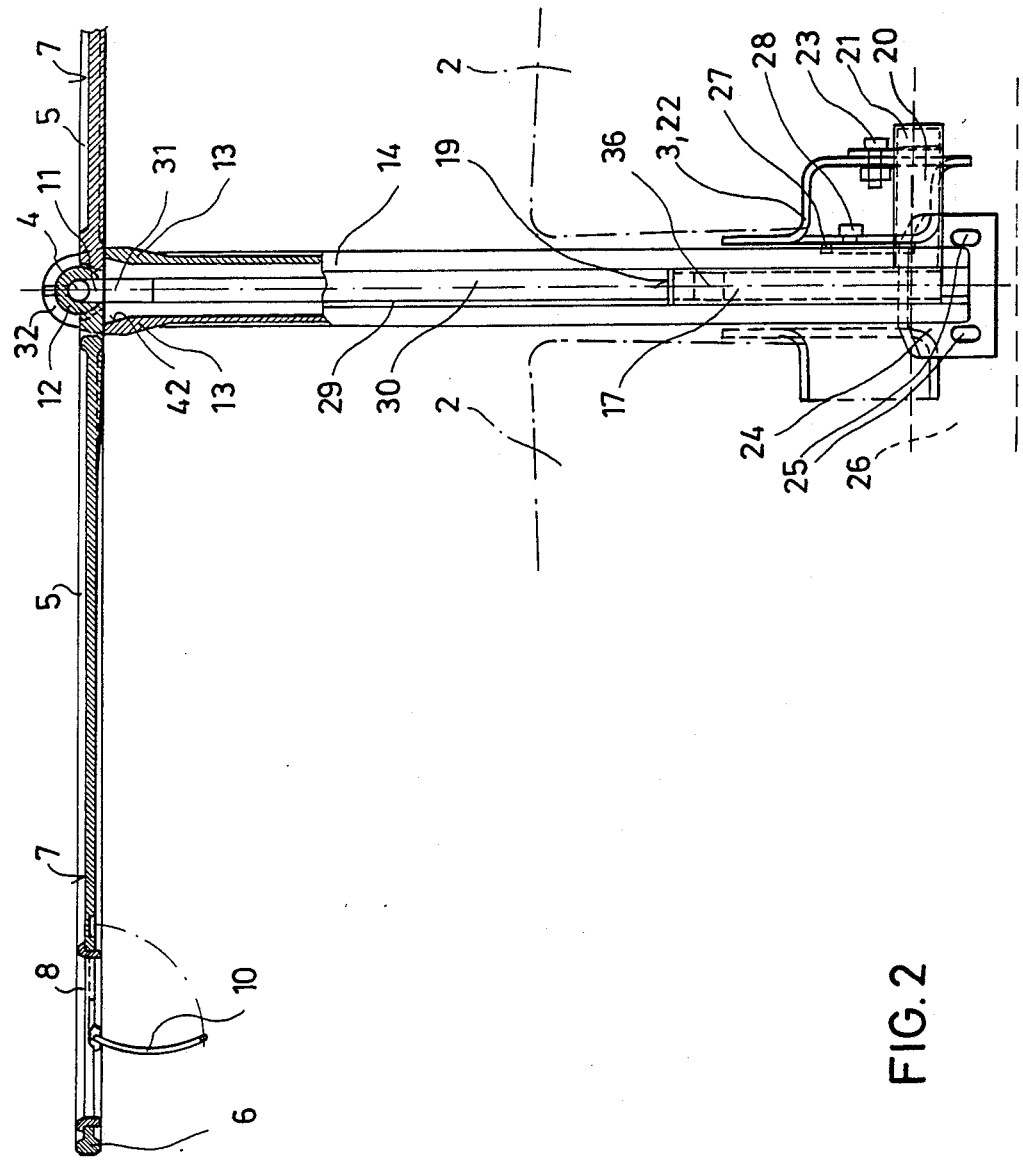
Figure 3:
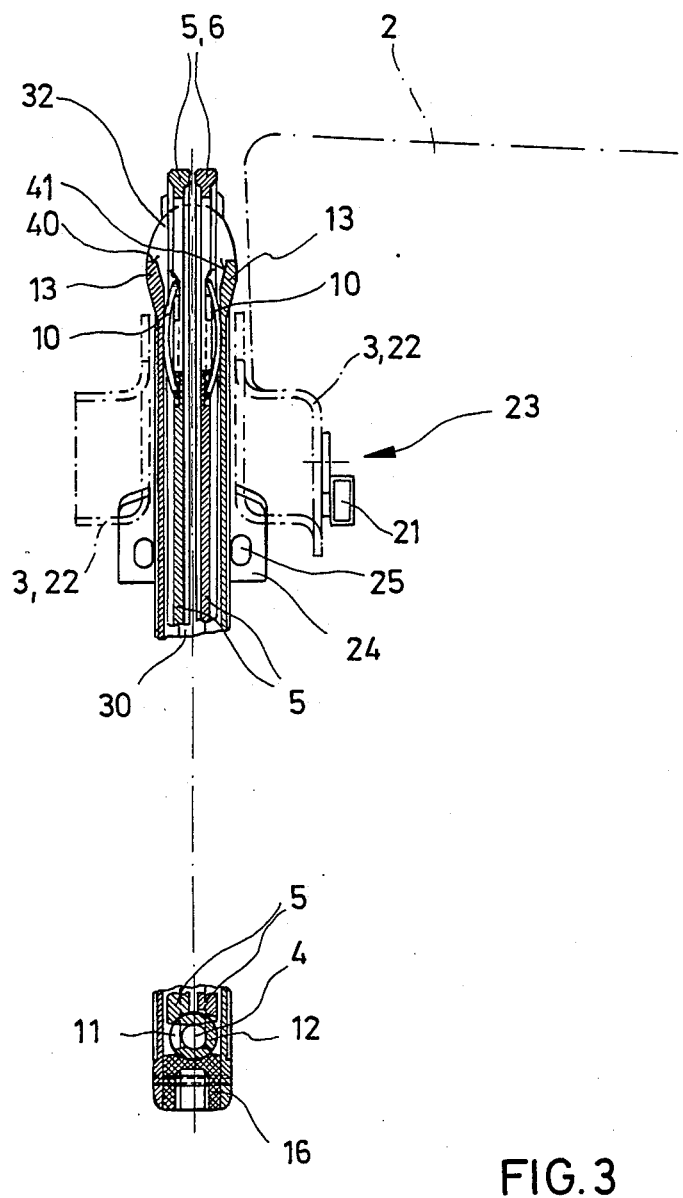
Figure 4:
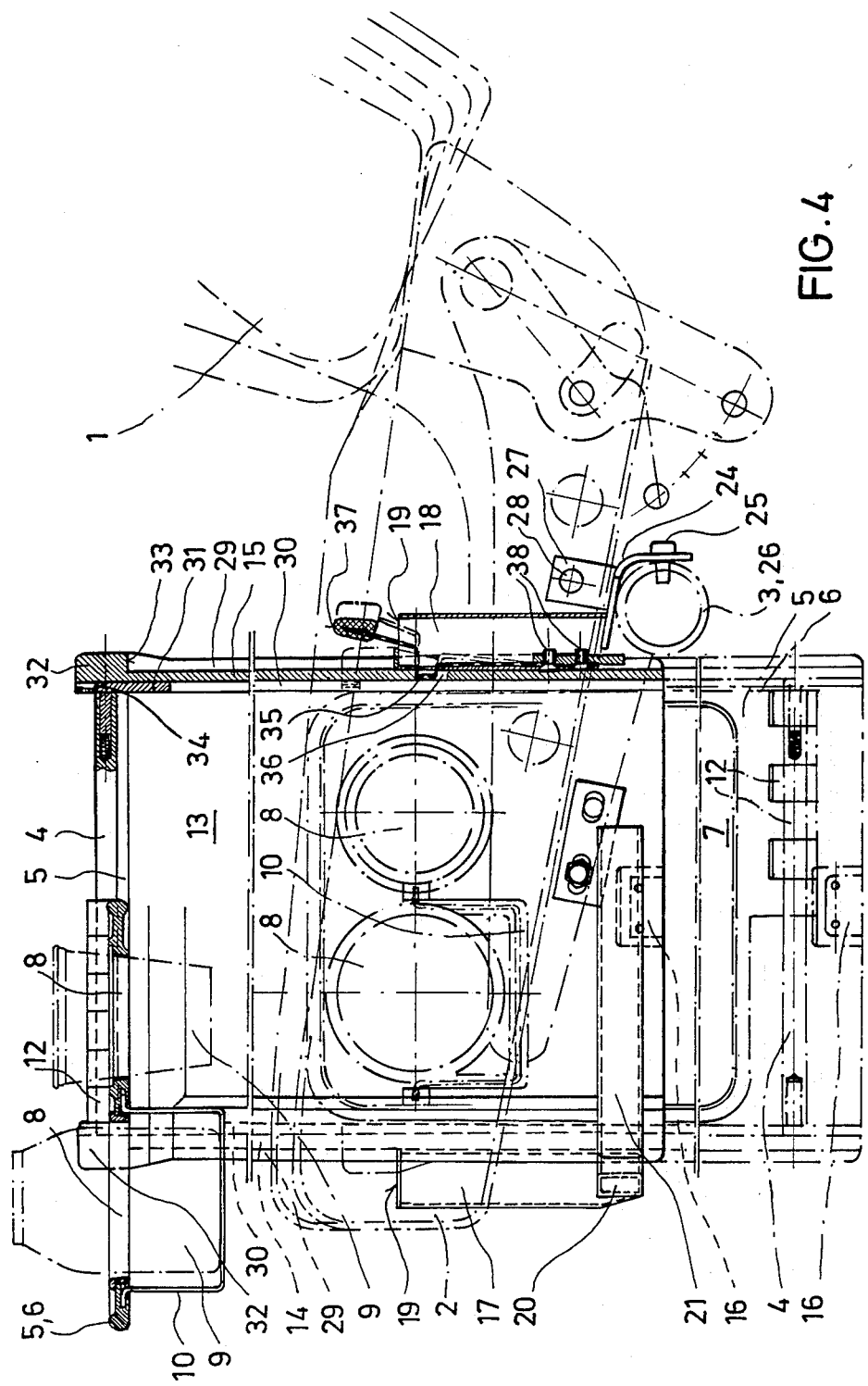

A preferred embodiment of the invention shall now be described by way of example with reference to the accompanying drawings, wherein:

FIG. 1 shows a top plan view of a fold-away table according to the invention in its use position, FIG. 2 shows a partial sectional view taken along the line II—II in FIG. 1, FIG. 3 shows a sectional view corresponding to FIG. 2 of the fold-away table in its storage position, and FIG. 4 shows a partially sectioned sideview of the fold-away table as seen from the right in FIG. 1.

In the embodiment shown in the drawings, a fold-away table according to the invention is disposed in a vertical plane between the seats of a motorcoach double-seat. Each seat is diagrammatically indicated by its backrest 1, its seat cushion surface 2 and its seat frame 3.

The fold-away table is composed of a stationary guide structure secured to seat frame 3, a housing structure vertically displaceable in said guide structure, a substantially horizontal pivot axis 4 slidably mounted in the housing structure, and a pair of table elements 5 hinged to pivot axis 5.

Each table element 5 is of rectangular shape and has a table surface 7 surrounded by a raised boundary 6 and formed with two through-openings 8 and 9 for receiving a respective container therein, for instance a cup and a bottle, at its end portion facing away from pivot axis 4. Secured to the bottom face of each table element 5 on both sides of the larger through-opening 8 is a wire bracket 10 which is pivotable between a position adjacent table element 5 as shown in FIG. 3 and a projecting position as shown in FIG. 2. In the latter position wire bracket 10 acts as a support for a cylindrical container which may be placed in the associated opening 8.

Along one of its shorter sides each table element 5 is mounted on pivot axis 4 by means of a bearing sleeve formed with a slot 11 extending over its full length. The width of the slot is somewhat smaller than the diameter of pivot axis 4, and the bearing sleeve itself is made of a resilient material, permitting table elements 5 to be disconnected from pivot axis 4 under excessive load. The mounting of table elements 5 is thus protected from damage.

Each bearing sleeve consists of a number of finger elements 12 mounted on pivot axis 4 in alternating sequence as can be seen in FIG. 1. The collective width of all finger elements 12 of both table elements 5 substantially corresponds to half the length of pivot axis 4. This permits table elements 5 to be displaced along pivot axis 4 between the position close to the user as shown in FIG. 1 and the position shown in FIG. 4 farther away from the user.

The vertically disposed housing structure comprises two guide plate members 13 extending from the front end portions of seat cushions 2 towards backrests 1 of the two adjacent -7 seats, and two likewise vertically extending narrow guide rails interconnected by guide plate members 13. A front guide rail 14 is located adjacent the front end portion of seat cushions 2, and a rear guide rail 15 is disposed adjacent backrests 1. Guide plate members 13 extend parallel to one another at a mutual distance which is slightly greater than the combined thickness of table elements 5 as defined by their raised boundaries 6. The distance between the two guide rails 14 and 15 substantially corresponds to the width of each table element 5 as measured in the horizontal direction. At a central location of the lower ends of guide plate members 13 there is provided a stop 16 for pivot axis 4

The stationary guide structure comprises a front guide element 17 and a rear guide element 18 cooperating respectively with front guide rail 14 and rear guide rail 15 of the housing structure for the displacement thereof in a vertical plane. The vertical length of both guide elements 17 and 18 substantially corresponds to the thickness of seat cushion 2, their upper end portions 19 being disposed just below the top surface of seat cushion 2. Front guide element 17 is secured to a cross member 20 connected to a longitudinally extending rod 21 itself secured by means of bolts 23 to a flange portion 22 of seat frame 3. Rear guide element 18 is connected to a bracket 24 secured to a cross member 26 of seat frame 3 by means of bolts 25. A lug 27 projecting from bracket 24 is additionally secured to seat frame 3 by a further bolted connection 28.

Each guide rail 14, 15 of the housing structure has an outer guide groove 29 and an inner guide groove 30 extending in the vertical plane of the housing structure. Guide elements 17, 18 are received in outer guide grooves 29, so that the housing structure is guided in the stationary guide structure for displacement between a lowered storage position as shown in phantom lines in FIG. 4 and a raised use position as indicated by solid lines in FIG. 4. Pivot axis 4 has both of its ends provided with a respective sliding block 31 slidably received in the associated inner guide groove 30. This permits pivot axis 4 together with the folded table elements 5, as shown in FIG. 3, to be displaced within the housing structure between a lowered storage position as shown in FIG. 3 and indicated by phantom lines in FIG. 4, and a raised use position shown in FIGS. 1 and 2 and indicated by solid lines in FIG. 4. In the use position, table elements 5 are spread apart or unfolded and may be shifted towards and away from the user.

The upper ends of guide rails 14, 15 are each provided with a head portion 32 forming an outer stop surface 33 and an inner stop surface 34 at the respective ends of outer and inner guide grooves 29 and 30, respectively. In the lowered storage position of the housing structure, outer stop surfaces 33 rest on the upper end faces 19 of guide elements 17 and 18. In this lowered storage position head portions 32 are disposed below the upper surface of seat cushion 2. The housing structure is locked in its raised use position by the engagement of a detent projection 35 of a detent lever 37 with a detent opening 36 in rear guide rail 15. Detent lever 37 is formed as a resilient arm and secured by a bolt connection 38 to the inner wall surface of rear guide element 18 facing towards rear guide rail 15 adjacent the location of detent opening 36.

In the lowered storage position, pivot axis 4 and thus the folded table elements 5 are supported on stop 16. In the raised use position, the upper rim portions 40 of guide plate members 13 act as supporting members for the unfolded table elements 5, which are in this manner frictionally locked in their unfolded position close to or farther away from the user. Upper rim portions 40 are connected to the main body of the respective guide plate member by a flared guide surface portion 41 for assisting the return of table elements 5 to the storage position.

The fold-away table according to the invention is operated as follows:

When the table is intended to be used, it is in its raised use position shown in FIGS. 1 and 2 and indicated by solid lines in FIG. 4. In this position housing structure 13,14, 15 projects upwards out of guide structure 17, 18 and is locked in position by the resilient engagement of detent projection 35 of detent lever 37 in detent opening 36. PiVot axis 4 is disposed at the upper limit of its stroke defined by the abutment of its sliding blocks 31 with stop surfaces 34 at the upper ends of guide rails 14, 15. Pivot axis 4 is retained in this position by the unfolded table elements 5 resting on upper rim portions 40 of guide plate members 13. In FIG. 4 the unfolded table elements 5 are shown to be displaced along pivot axis 4 to a position away from the user, so that they project beyond pivot axis 4 by about half their width. The smaller through-opening 9 has a drinking cup inserted therein, while a bottle of cylindrical shape is inserted in the greater through-opening 8, wire bracket 10 having been swung downwards as shown in FIGS. 2 and 4 to act as a support for the bottle.

For returning the table to its lowered storage position after use, the two table elements 5 are initially slid backwards to their positions close to the user as shown in FIG. 1, in which the rearmost finger element 12 abuts the inner surface of head portion 32 of rear guide rail 15. After the cups and bottles have been removed, table elements 5 are folded upwards about pivot axis 4 until their raised boundaries contact one another. At the same time wire brackets 10 are pivoted to their positions adjacent table elements 5 as shown in FIG. 3. The table elements 5 are now aligned in a vertical plane above the opening defined by guide plate members 13 and guide rails 14, 15. After retracting detent projection 35 from detent opening 36, table elements 5 together with pivot axis 4 are pushed downwards into the housing structure until pivot axis 4 comes to rest on stop 16. During this operation sliding blocks 31 of pivot axis 4 act to guide table elements 5 along inner guide grooves 30 of guide rails 14, 15. At the same time wire brackets 10 come into engagement with the interior surfaces of guide plate members 13, so that table elements 5 are received in the housing structure without lateral play therebetween.

Further exertion of a downwards directed pressure on table elements 5 causes housing 13, 14,15 to be displaced downwards to the lowered storage position, this movement being guided by the engagement of guide elements 17 and 18 with outer guide grooves 29 of guide rails 14, 15. In this position of housing structure 13, 14, 15, outer stop surfaces 33 rest on upper end faces 19 of guide elements 17, 18. Table elements 5 project slightly above head portions 32 of the housing structure, but are still disposed below the upper surface of seat cushions 2.

For returning the fold-away table to its raised use position, the above described operations are carried out in reverse sequence. These operations do not include any actuation of detent lever 37, because the spring action thereof causes its detent projection 35 to automatically drop into detent opening 36 as soon as the housing structure reaches its raised use position.

I claim:

1. A fold-away table for a vehicle seat having a seat frame, said table comprising:
   a mounting base defining a stationary guide structure;
   means for securing said mounting base to the seat frame at a location disposed laterally from the seat with said guide structure lying in a vertical plane;
   a carrier defining a housing structure with an open top, said carrier being mounted on said guide structure for displacement in said vertical plane between a lowered storage position and a raised use position;
   a substantially horizontal pivot axis;
   means for mounting said pivot axis on said carrier for displacement in said vertical plane between a lowered position located within said housing structure at the lower end thereof, and a raised position at the open top of said housing structure; and
   at least one table element mounted on said pivot axis for pivotal movement between a folded position lying in said vertical plane, and an unfolded position extending laterally from said vertical plane, said table element when in said folded position being arranged to be lowered with said pivot axis into said housing, whereupon said carrier may then be lowered on said guide structure to said storage position.

2. A fold-away table according to claim 1 wherein said housing structure comprises two mutually spaced guide plate members having guide rails arranged therebetween.

3. A fold-away table according to claim 2 wherein said stationary guide structure comprises two guide elements each engaging a respective outer guide groove in said guide rails.

4. A fold-away table according to claim 2 wherein each of said guide rails has an inner guide groove for guiding therein slide blocks carried by respective ends of said pivot axis.

5. A fold-away table according to claim 3 wherein the upper ends of said guide rails are each provided with a head portion defining an inner and an outer stop face for said pivot axis and said housing structure, respectively at respective ends of said inner and outer guide grooves.

6. A fold-away table according to claim 5 wherein the upper boundary faces of said guide elements are formed as counterstop surfaces for cooperation with said outer stop surfaces.

7. A fold-away table according to claim 2 wherein a stop is provided on said pivot axis at the lower end of said guide plate members.

8. A fold-away table according to claim 2 wherein a bracket is provided for guiding said table element on said guide plate members and for eliminating any play therebetween.

9. A fold-away table according to claim 8 wherein said bracket is secured to said table element.

10. A fold-away table according to claim 9 wherein said table element is formed with at least one through-opening for receiving a container therein.

11. A fold-away table according to claim 10 wherein said bracket is formed as a pivotable bracket adapted to be pivoted between a folded position adjacent to said table element and an unfolded position below said through-opening for supporting said container therein.

12. A fold-away table according to claim 1 wherein said table element is slidably mounted on said pivot axis.

13. A fold-away table according to claim 11 wherein said table element is slidingly displaceable between a position close to the user in proximity of the back rest of the seat, and a position removed from the user.

14. A fold-away table according to claim 11 wherein said table element is mounted on said pivot axis by means of a bearing sleeve.

15. A fold-away table according to claim 14 wherein said bearing sleeve is provided with a slot extending over its full length and having a wide slightly smaller than the diameter of said pivot axis.

16. A fold-away table according to claim 15 wherein said bearing sleeve is of resilient construction.

17. A fold-away table according to claim 1 wherein said pivot axis carries two table elements mounted thereon.

18. A fold-away table according to claim 17 wherein said table elements have bearing sleeves formed as a plurality of finger elements mounted in alternating sequence on said pivot axis.

19. A fold-away table according to claim 18 wherein said finger elements of said table elements as measured in the longitudinal direction of said pivot axis substantially correspond to half of its length.

20. A fold-away table according to claim 2 wherein said pivot axis carries two table elements, and wherein the upper rim of respective ones of said guide plate members is formed as a support for said unfolded table elements.

21. A fold-away table according to claim 20 wherein the upper rims of said guide plate members are connected to the interior wall surfaces thereof through respective flared inlet guide surfaces for said table elements.

22. A fold-away table according to claim 1 wherein said stationary guide structure is disposed at the level of the seat surface of the seat.

23. A fold-away table according to claim 2 wherein said housing structure is locked in the raised use position by a detent lever engaging a detent opening in one of said guide rails.

24. A fold-away table according to claim 23 wherein said detent lever is mounted on a rear guide element facing towards the backrest of the seat.

25. A fold-away table according to claim 24 wherein said rear guide element is secured to a transverse axis of said seat frame by means of a mounting bracket.

* * * * *